United States Patent [19]

Dietz et al.

[11] Patent Number: 4,499,118
[45] Date of Patent: Feb. 12, 1985

[54] METHOD FOR COATING WITH AN ATOMIZABLE MATERIAL

[75] Inventors: Peter W. Dietz, Delanson; Ralph T. Wood, Elnora, both of N.Y.

[73] Assignee: General Electric Company, Schenectady, N.Y.

[21] Appl. No.: 553,657

[22] Filed: Nov. 21, 1983

Related U.S. Application Data

[62] Division of Ser. No. 345,508, Feb. 3, 1982, Pat. No. 4,440,350.

[51] Int. Cl.³ .......... B05B 5/08; B05B 13/06

[52] U.S. Cl. .......... 427/28; 118/317; 118/622; 118/DIG. 10; 427/64; 427/66; 427/106; 427/223; 427/236

[58] Field of Search .......... 118/622, 624, 626, 627, 118/628, 317, 323, DIG. 10; 427/28-31, 64, 66, 67, 106, 233, 236, 223; 239/3, 703, 223, 224, 7

[56] References Cited

U.S. PATENT DOCUMENTS

| | | | |
|---|---|---|---|
| 2,762,943 | 9/1956 | Mayer | 427/64 X |
| 2,995,463 | 8/1961 | Meister et al. | 427/28 |
| 3,010,428 | 11/1961 | Sedlacsik | 239/703 X |
| 3,418,971 | 12/1968 | Lamm | 239/224 X |
| 4,215,818 | 8/1980 | Hopkinson | 427/31 X |

FOREIGN PATENT DOCUMENTS

| | | | |
|---|---|---|---|
| 524570 | 10/1976 | U.S.S.R. | 118/317 |

*Primary Examiner*—Andres Kashnikow
*Attorney, Agent, or Firm*—Bernard J. Lacomis; James C. Davis, Jr.

[57] ABSTRACT

A method for applying a coating of atomizable material to the inside surface of a glass tube comprises positioning a rotatable member within the tube, delivering the material to a surface of the member adapted to receive the material, and rotating the member at a predetermined velocity to atomize the material and impact the surface of the tube with at least a portion of the atomized material. A potential difference may be established between the atomized material and the surface of the tube to improve coating efficiency. The surface of the tube may be maintained at an electrical potential, and multiple coatings may be produced.

14 Claims, 2 Drawing Figures

METHOD FOR COATING WITH AN ATOMIZABLE MATERIAL

This application is a division of Application Ser. No. 345,508, filed Feb. 3, 1982, now U.S. Pat. No. 4,440,350.

This invention also relates to co-pending applications Ser. No. 345,509 entitled "Seal Free Rotating Atomizer" and Ser. No. 345,510 entitled "Method of Coating with an Atomizable Material," both assigned to the same assignee as this application.

BACKGROUND OF THE INVENTION

This invention relates to coating of glass bulbs or tubes. More particularly it relates to an apparatus and method for coating the interior surface of glass bulbs or tubes.

Glass bulbs or tubes, which are used as the envelope of fluorescent lamps, are generally coated with one or more layers of phosphor. The phosphor coating transforms some of the ultraviolet energy generated by an electrical discharge within the bulb into visible light.

A color rendering index, which is a measure of the degree to which the perceived colors of objects illuminated by light sources conform to those of the same objects illuminated by a reference source, typically sunlight, under specific conditions, is generally used to determine light quality. It has been found that color rendering of a fluorescent lamp can be generally improved by applying multiple layers of phosphors, each of which may have a different composition. Further, the degradation of phosphors over time may be decreased by applying a protective coating of a nondepreciating material such as a protective phosphor. In applying these multiple coatings of phosphors, it is desirable that each layer of phosphor be uniform throughout the length of the bulb e.g. same thickness, same phosphor content per unit area, etc., in order that the light produced along the length of the bulb is uniform.

In a current commercial coating process, a predetermined amount of a phosphor slurry is introduced into an open end of a vertical glass tube to contact the sides thereof. The slurry is permitted to flow down the sides of the tube forming a film of phosphor thereon. Any excess slurry flows out the open bottom of the tube and is collected and recycled, which may lead to impurities being added and to expensive attempts to maintain a clean environment. In this process, control over the slurry and tube parameters is crucial in order to obtain uniform coating. This control is generally provided by controlling the viscosity, total solids (phosphors) and temperature of the slurry and temperature and surface wetness of the tube. Even with such controls, it is difficult to ensure that the thickness and phosphor content per unit area of the coating from one end of the tube to the other are uniform.

When a multiple phosphor coating is to be used, as for instance to increase the color rendition of the lamp or to slow the degradation of a previously coated or base phosphor, it is preferable that the additional or secondary phosphor be applied in a relatively thin uniform coating. The secondary phosphors, which may improve color rendition or inhibit the degradation of a previously deposited, or base, phosphor, are traditionally much more expensive that the base phosphors. Thus, in order to avoid excess and waste it is desired to deposit only as much of the secondary phosphor as will actually be effective for its intended purpose. Such stringent control over the coating process is impractical with the flow coating method presently employed.

SUMMARY OF THE INVENTION

It is an object of the present invention to provide an apparatus and a method for applying a uniform coating to the inside of a glass tube.

Another object of the present invention is to provide an apparatus and a method for applying multiple coatings to the inside of a glass tube.

In accordance with the present invention, an apparatus for applying a coating of an atomizable material to the inside of a glass tube comprises a rotatable member having a surface for receiving the material wherein the surface rotates together with the member, and drive means for rotating the member. The drive means is preferably situated along the same direction as the extension of the axis of rotation through the surface of the member.

Further, in accordance with the present invention, a method for applying a coating of atomizable material to the inside surface of a glass tube comprises positioning a rotatable member within the tube, and delivering the material to a surface of the member adapted to receive the material. The surface of the member rotates with the member. The member is rotated at a predetermined angular velocity in order to cause the material to be thrust from the surface of the member, whereby droplets of material are formed and at least a portion of the droplets impact the surface of the tube.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
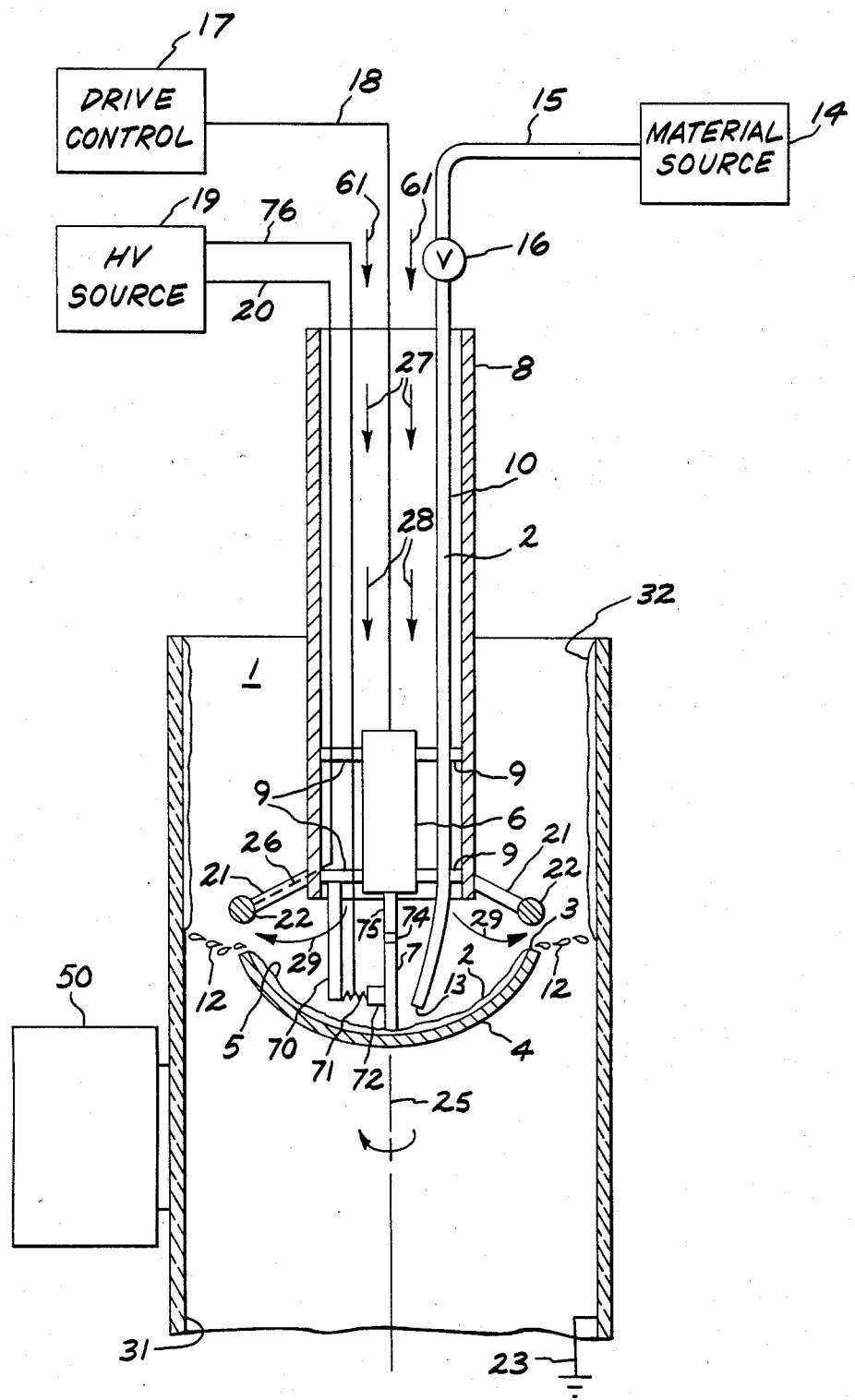
FIG. 1 illustrates an embodiment in partial section and schematic, of the present invention.

Shown in FIG. 1 is an apparatus 1 for applying a coating 32 of an atomizable material 2, as for instance a phosphor slurry, to the inner surface 31 of a glass tube or bulb 30. The apparatus 1 comprises a rotatable member 4 having a surface 5 for receiving the material 2, drive means 6, such as a motor or air-driven turbine, for rotating the member 4, and material delivering means 10, such as a conduit.

The motor shaft 75 is fixedly connected to member 4 by a drive link 7, which may be an extension of the shaft 75 of the motor 6, whereby member 4 is rotated by motor 6. Motor 6 is preferably situated along the same direction as the extension of the axis of rotation 25 through the surface 5 of the member 4. Motor 6 may be conveniently fixedly supported within a hollow cylinder 8. Where electrical fields are to be used, as hereinafter described, the cylinder 8 may be plastic or insulative type material in order to facilitate electrical insulation therefrom and to prevent field distortion which may occur if cylinder 8 is metallic. Standoffs 9 may be used as required between motor 6 and cylinder 8 to support motor 6 within cylinder 8. Of course a container 8 shape other than cylindrical, such as a hollow rectangular prism, may be used.

The cylinder 8 also helps to prevent vibration or motor 6 and member 4, and also contains and directs gas 61 as hereinafter described. Motor vibration is undesirable since it is communicated to, and becomes a source of surface instabilities in the material 2, causing surface waves in the material 2 as it flows across the surface 5 of member 4. Cylinder 8 should be long enough to permit member 4 to be translated the entire length of tube 30 without interfering with drive control 17, material source 14, high voltage source 19 and their associated connecting and control means.

Material 2 is supplied to the input of a control valve 16 from source 14 through connecting means 15. The output from the control valve 16 is connected in flow communication with one end of the conduit 10. The conduit 10 is positioned such that the other end 13 thereof is spaced from the surface 5 of member 4 and is situated to direct the material 2 emanating from end 13 thereof onto surface 5 of member 4. Conduit 10 is further preferably situated along the same direction as the extension of the axis of rotation 25 through the surface 5 of the member 4.

The preferred positioning of the drive means 6 and the conduit 10 with respect to the surface 5 of member 4 will allow the entire apparatus 1 to be introduced into tube 30 from one end of tube 30 and will also permit translation within tube 30.

Control means 17 is provided to communicate with drive means 6 via connecting means 18. If drive means 6 includes an electrical motor, then the output from control means 17 will typically include electric power and speed control to motor 6. If drive means 6 includes an air turbine, then control means 17 will typically supply forced air to air turbine 6 to provide power and control speed. Hence, the output from control means 17 is chosen to be compatable with and to provide power and speed control to selected drive means 6.

In operation, material 2 to be atomized is delivered from the source 14 thereof by way of connecting means 15, control valve 16 and conduit 10 to the surface 5 of member 4. Member 4 is rotated at a predetermined angular velocity in order to cause material 2 to flow over surface 5 and to be forced or thrust from surface 5 at edge 3 thereof in order to form droplets 12 of material 2.

Preferably material 2 is directed onto surface 5 of member 4 at the axis of rotation thereof to minimize or eliminate surface waves. Surface waves are undesirable since they create an uneven flow of material 2 across surface 5 of member 4, thereby causing the amount of material 2 reaching edge 3 of surface 5 to vary. This in turn causes non-uniform sizes, while uniform sized droplets are preferable in order that their responses and reactions in subsequent processes in which they may be used are predictable and repeatable.

Apparatus 1 is positioned within the tube 30 to be coated, preferably concentrically therewith to obtain uniform dispersion. At least a portion of the droplets 12 formed are caused to strike or impact the inner surface 31 of tube 30. Either the apparatus 1 or tube 30 or both may be translated as by translation means 50, FIG. 1, so as to provide relative motion or translation therebetween and to provide a coating 32 of material 2 along the desired portion of the tube 30. Multiple coatings may also be applied as by applying a coating in one direction, changing the material content and reversing the direction of application.

Since a constant material 2 composition can be maintained, the coating 32 parameters such as thickness, density, etc., are much more readily controllable than by the aforementioned flow method. This is very desirable for applying a thin uniform coating 32, as for instance, where a second thin layer or coating of an expensive phosphor is coated onto an existing layer or coating of phosphor in order to increase the color rendering index of the tube. Also there can be less waste material, or material not coated, since the composition thereof can be such that almost all the droplets 12 formed will adhere to the surface 31 of the tube 30. Further, since it is not required that the material 2 flow along the surface 31 of the tube 30, the material 2 used with the present invention may be more viscous, thereby decreasing the amount of solvent or carrier liquid needed for the particulate component of the material 2.

A plurality of material sources for different compositions of material and associated control and delivery means may be used when multiple coatings are desired. Control of the material flow to surface 5 of member 4 by a plurality of control valves 16 would permit rapid changeover to a different composition of material and would allow the coatings to be applied in alternate directions as the direction of translation of the apparatus with respect to tube 30 was reversed, thus saving time by eliminating the need to recycle to the initial starting point before beginning to apply another coating.

To improve the quality and uniformity of coating 32, and improve efficiency in applying coating 32, a potential difference may be established between the material 2, or droplets 12 formed therefrom, and the surface 31 of tube 30 to be coated.

A non-conductive region 74 electrically insulates shaft 75 from drive link 7 and member 4. Drive link 7 and member 4 may be fabricated of a conducting material, such as metal, and thereby be in electrical communication. An electrical potential may be applied to drive link 7 whereby member 4 will be likewise charged. A support 70 fabricated of an electrically insulative material is affixed at one end to a standoff 9. The other end of support 70 has, at one end, a spring 71 fabricated of an electrically conducting material, affixed thereto. The other end of spring 71 is affixed to a block or brush 72 of a conducting material such as graphite. Spring 71 is selected to bias brush 72 against drive link 7 such that electrical continuity exists between brush 72 and drive link 7. High voltage source 19 is coupled to spring 71 by connecting means 76. The outputs from high voltage source 19 need not be equal and a separate source for each output may be used. Material 2 will be electrically charged while flowing over surface 5 of member 4 and droplets 12 formed therefrom will thereby likewise be electrically charged. The electrical potential applied to drive link 7 may be either positive or negative with respect to ground potential. With the droplets 12 electrically charged, it is desirable to maintain the surface 31 of the tube 30 at ground potential. However, drive link 7 may be maintained at ground potential and the high or non-ground electricl potential applied to surface 31 of tube 30, whereby droplets 12 formed would be at ground potential. The potential difference established between member 4 and surface 31 of tube 30 creates an electric field at edge 3 of member 4 which facilitates atomization of material.

Typically a connecting means 23 may be attached to surface 31 of tube 30 in order to establish electrical continuity between surface 31 and ground potential. However, since the tube 30 is glass, which is typically non-conductive, various ways, some of which will be discussed by way of example and not by way of limitation, may be employed to increase the conductivity thereof in order that a ground or electrical potential contact applied at any point on surface 31 will maintain the applied potential over the entire surface 31.

In one case, tube 30 may be heated until the glass conducts, as heated glass is generally electrically conducting. If the tube 30 is heated by a flame, an electrode (not shown) which is electrically coupled to the desired voltage (or ground) potential may be placed within the flame to maintain the surface at the desired potential, since a flame is electrically conducting. Using a flame as part of the electrical coupling means may also allow the glass tube 30 to be subjected to simultaneous lehring or glass conditioning. Alternatively, a thin conductive coating, as a metal or metal oxide, may be applied to surface 31 before attaching connecting means 23 thereto. In another case, surface 31 may be wetted as with water to increase the conductivity thereof. In yet another case, where coating 32 is electrically conducting, a strip or region of coating 32 may be applied to surface 31 with connecting means 23 in electrical communication with the strip. Additional coating 32 may be applied adjacent to and abutting the strip or previously applied coating 32, in order to maintain ground potential throughout coating 32.

In still another case, the apparatus 1 may further comprise electrode means 22, such as a ring electrode, situated to create an electric field at least at the edge 3 of member 4. The ring electrode 22 is secured by supports 21 to the cylinder 8. High voltage source 19 is provided to energize the ring electrode 22 through connecting means 20. One end 26 of connecting means 20 may conveniently pass through a hole in cylinder 8 and within a channel in support 21 in order to provide electrical communication between high voltage source 19 and ring electrode 22.

The member 4 and surface 31 of tube 30 may be maintained at ground potential when a ring electrode 22 is used. By way of example and not by way of limitation, this may be effected on member 4 by fabricating both member 4 and drive link 7 of an electrically conductive material such as a metal, and maintaining a continuous electrical communication path between member 4 and the shaft of the motor 6 through drive link 7. In this fashion, the surface 31 of the tube 30 may be at ground potential, as herein before described, while ring electrode 22 and member 4 are charged to a high voltage. Alternatively, member 4 may be maintained at ground potential while ring electrode 22 and surface 31 of tube 30 are charged to a high voltage.

With the electric field created at the edge 3 of member 4, the apparatus 1 can be used to atomize material 2 having a higher solids content then can be done without the electric field. This is because the energy in the electric field overcomes the surface tension force in the material 2 to form droplets 12. Thus quicker drying of the coating 32, less solvent or carrier liquid use for the material 2 and absence of running or dripping of material 2 in the coating 32 can be effected, and the solids content of the coating 32 per unit area and the thickness of the coating can be better controlled.

Additionally, a gas 61 from a source (not shown) may be caused to flow within cylinder 8 in the direction indicated by arrows 27, 28, 29 in order to direct droplets 12 away from ring electrode 22 thereby preventing the contamination of ring electrode 22 with material 2. Cylinder 8 will prevent dispersion of gas 61 and thereby aid in maintaining the indicated flow pattern.

Figure 2:
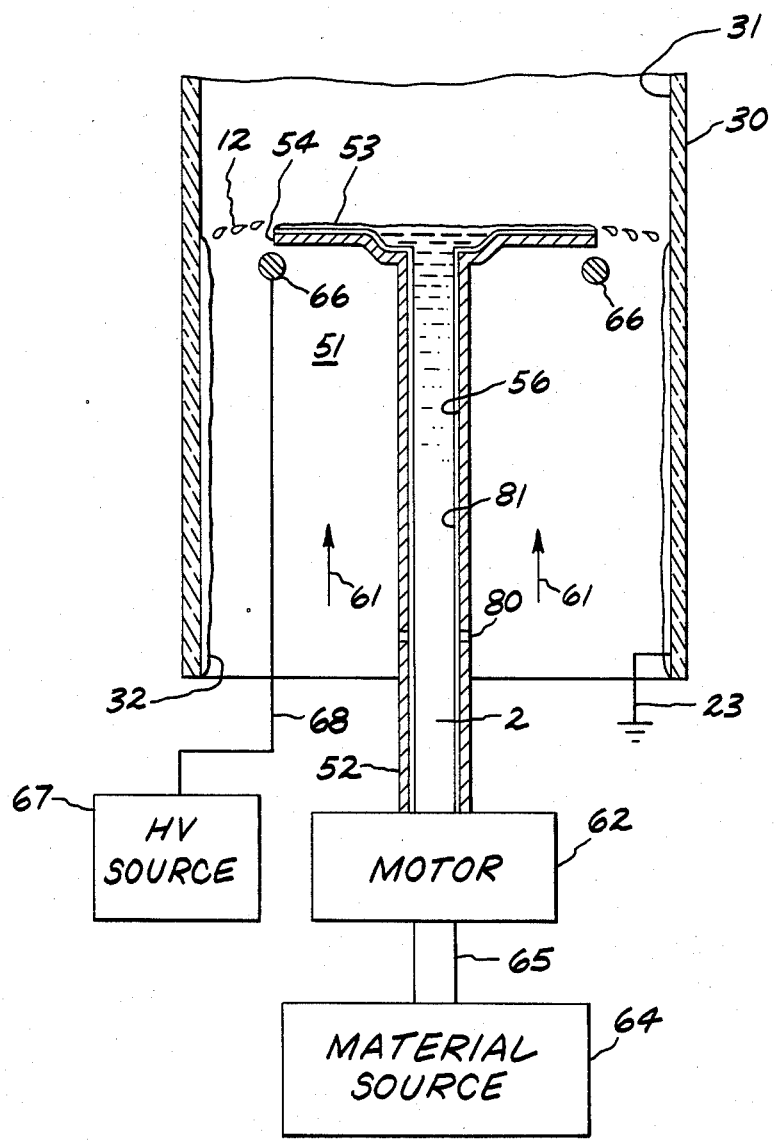
FIG. 2 illustrates another embodiment, in partial section and schematic, which may be used to practice the present invention.

Shown in FIG. 2 is another configuration of an apparatus 51 which may be used in practicing the present invention. Apparatus 51 comprises a rotatable member 52 having a surface 53 adapted to receive the material 2 to be atomized and includes therein a passageway 56 for delivering material 2 to surface 53 of member 52. Apparatus 51 also includes a drive means 62, as for instance a motor or air turbine, for rotating member 52, a source of material 2 and connectng means 65 for permitting flow communication between material delivery means 56 and source 64 of material 2. Typically delivery means 56 has a terminus at surface 53.

In operation, member 52 and surface 53 rotating therewith, are rotated at a predetermined angular velocity in order to cause material 2 supplied from source 64 thereof to flow across surface 53 to edge 54 thereof and force or thrust material 2 from the edge 54 to form droplets 12. The tube 30 and surface 31 thereof to be coated may be positioned to be impacted by droplets 12 as hereinbefore described to form layer or coating 32 on surface 31.

Additionally, a potential difference may be created between surface 53 and/or material 2 and surface 31 of tube 30. The surface 31 may be maintained at ground potential as hereinbefore described. Surface 53 or material 2 may be electrically charged to either a positive or negative potential with respect to ground potential. Alternatively, member 52 or material 2 may be maintained at ground potential, with surface 31 of tube 30 energized to be at either a positive or a negative potential. Appropriate insulating means such as an insulating region 80 and layer 81 of insulation on the wall of channel 56 may be used to prevent shorting of the electrical potential on material 2 and/or surface 53 through the motor 62.

Additionally, a ring electode 66 energized from a high voltage source 67 via connecting means 68 may be used to create an electric potential on droplets 12 as hereinbefore described. The member 52 and surface 53 may be of metal or maintained at ground potential through the motor 62. Further, a gas 61 may be caused to flow within the tube 30 in the direction indicated by the arrows in order to direct droplets 12 away from ring electrode 66, thereby preventing contamination of the ring electrode 66 with material 2.

Thus an apparatus and method for applying a uniform coating to the inside of a glass tube has been illustrated and described. Further, an apparatus and a method for applying multiple coatings to the inside of a glass tube has also been illustrated and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for applying a coating of atomizable material to the inside surface of a glass tube comprising:
    (a) positioning a non-rotatable hollow tubular support means for inserting into said tube, said support means housing a drive means having a rotatable member affixed thereto adjacent to one end of said support means,;

(b) delivering said material to a surface of said member adapted to receive said material via a path through said support means,;

(c) concurrently rotating said member at a predetermined angular velocity in order to cause said material to be thrust from said surface of said member and translating said support means relative to said tube along the axis of said tube, whereby droplets of material are formed and at least a portion of said droplets impact said inside surface of said tube parallel to the axis thereof; and (d) performing (b) and (c) concurrently.

2. A method as in claim 1 wherein positioning said member includes locating said member to be concentric with said tube.

3. A method as in claim 1 wherein delivering said material to said surface of said member includes delivering said material at the axis of rotation of said surface of said member.

4. A method as in claim 1 further comprising repeating steps a through c wherein a material having a different composition from the material employed in the previous coating operation is used.

5. A method as in claim 1 further comprising establishing an electric potential difference between said material and said surface of said tube.

6. A method as in claim 5 wherein establishing said electrical potential difference includes energizing a ring electrode to create an electrical field at least at the edge of said surface of said member and maintaining said surface of said tube and said surface of said member at ground potential.

7. A method as in claim 5 wherein establishing said electrical potential difference includes charging said material such that said material is at other than ground potential.

8. A method as in claim 7 wherein maintaining said surface of said tube at ground potential includes heating said tube until said surface of said tube is elctrically conductive and connecting said surface of said tube to ground potential.

9. A method as in claim 8 wherein connecting said surface of said tube to ground potential includes forming a conducting path between said surface of said tube and ground potential through a flame, said flame providing said heating of said tube.

10. A method as in claim 7 wherein maintaining said surface of said tube at ground potential includes coating said surface of said tube with a conductive layer and connecting said conductive layer to ground potential.

11. A method as in claim 7 wherein maintaining said surface of said tube at ground potential includes establishing a region of said material, connecting said region to ground potential and impacting said surface of said tube adjacent to and abutting said region in order to maintain electrical communication therewith.

12. A method as in claim 6 further comprising creating a flow of gas within said tube, said gas flow directing material thrust from said surface away from said ring electrode.

13. A method as in claim 5 wherein establishing said electrical potential difference includes energizing a ring electrode to create an electrical field at least at the edge of said surface of said member, charging said surface of said tube to a high potential and maintaining said surface of said member at ground potential.

14. A method as in claim 5 wherein establishing said electrical potential difference includes energizing a ring electrode to create an electrical field at least at the edge of said surface of said member, charging said surface of said member to a high potential and maintaining said surface of said tube at ground potential.

* * * * *